（12) United States Patent
Kim et al.

(10) Patent No.: US 10,827,870 B2
(45) Date of Patent: Nov. 10, 2020

(54) ELECTRIC COOKER

(71) Applicant: CUCKOO ELECTRONICS CO., LTD., Yangsan-si, Gyeongsangnam-do (KR)

(72) Inventors: Won Young Kim, Busan (KR); Soo Ho Son, Busan (KR); Seung Yun Kim, Busan (KR)

(73) Assignee: CUCKOO ELECTRONICS CO., LTD., Yangsan-si (KR)

( * ) Notice: Subject to any disclaimer, the term of this patent is extended or adjusted under 35 U.S.C. 154(b) by 390 days.

(21) Appl. No.: 15/924,723

(22) Filed: Mar. 19, 2018

(65) Prior Publication Data

US 2018/0296019 A1     Oct. 18, 2018

(30) Foreign Application Priority Data

Apr. 14, 2017    (KR) .......................... 10-2017-0048686

(51) Int. Cl.
    *A47J 27/08*       (2006.01)
    *A47J 27/00*       (2006.01)
    *A47J 27/092*      (2006.01)
(52) U.S. Cl.
    CPC ......... *A47J 27/0802* (2013.01); *A47J 27/004* (2013.01); *A47J 27/0813* (2013.01); *A47J 27/092* (2013.01)
(58) Field of Classification Search
    USPC ............................. 219/401; 99/337, 403, 418
    See application file for complete search history.

(56) References Cited

U.S. PATENT DOCUMENTS 7,148,451 B2 * 12/2006 Miyake ................. A47J 27/004
                                                          219/440
7,703,385 B2 * 4/2010 Seurat Guiochet ..... A47J 27/09
                                                          99/337

FOREIGN PATENT DOCUMENTS

| CN | 1957807 | 5/2007 | | |
|---|---|---|---|---|
| CN | 201349953 | 11/2009 | | |
| CN | 104510362 | 4/2015 | | |
| CN | 205849232 | 1/2017 | | |
| KR | 20090030110 | * | 9/2007 | .............. A47J 27/08 |
| KR | 200452540 | * | 8/2008 | .............. A47J 27/08 |

OTHER PUBLICATIONS

Machine Translation of KR20090030110 ; Jun. 2020 (Year: 2020).*
Machine Translation of KR200452540; Jun. 2020 (Year: 2020).*

* cited by examiner

*Primary Examiner* — Tu B Hoang
*Assistant Examiner* — Thomas J Ward
(74) *Attorney, Agent, or Firm* — Kile Park Reed & Houtteman PLLC (57) ABSTRACT

To enable a user to cook both in a pressure state and in a non-pressure state inside the inner pot and thus improve cooking quality and ease of use, the present invention provides an electric cooker including a main body in which an inner pot for accommodating food is installed; a lid coupled to the main body to be opened or closed, in which a passthrough portion is formed; a pressure converter communicating with the passthrough portion, in which a selectively opened/closed state for discharging steam inside the inner pot is maintained; and a pressure-responsive actuators communicating with the passthrough portion and selectively opened/closed depending on a pressure level inside the inner pot in a pressure cooking mode.

12 Claims, 7 Drawing Sheets

ELECTRIC COOKER

This application claims the benefit of Korean Application No. 10-2017-48686 which was filed on Apr. 14, 2017, which was hereby incorporated by reference as if fully set forth herein.

FIELD

The present invention relates to an electric cooker, and more specifically, to an electric cooker capable of cooking both in a pressure state and in a non-pressure state inside an inner pot, thereby improving cooking quality and ease of use.

BACKGROUND OF RELATED ART

Generally, electric cookers refer to electric rice cookers, electric pressure cookers, and the like, and include a main body with a heater and a lid for covering an upper portion of the main body.

Further, an inner pot for accommodating food is installed in the main body, and the lid is hinge-connected to one side of the main body to be opened or closed and is provided with an inner pot cover at a bottom of the lid so as to seal an upper end opening of the inner pot. In this case, a flow hole communicating with an inside of the inner pot is formed in one side of the inner pot cover, and steam inside the inner pot may flow through the flow hole to a pressure controller provided in the lid.

Specifically, the pressure controller may include a solenoid valve electrically driven to open or close a steam discharge path connecting the inside of the inner pot with an outside of the cooker, and a pressure relief valve for maintaining the internal pressure of the inner pot at a constant level. That is, when the cooking is started, the steam discharge passage is closed through the solenoid valve to increase the internal pressure of the inner pot, and the internal pressure of the inner pot may be maintained at a constant level through the pressure relief valve.

However, since conventional electric cookers maintain the inside of the inner pot at one preset pressure level through interactions between weight pressure and vapor pressure, there is a problem in that a user cannot apply or select a cooking method suitable for the user's preference or a type of food and thus the cooking quality of the cookers is degraded. In other words, in the case of a cooking material requiring no pressure to cook, there is a problem in that a texture thereof softens up due to a high pressure. Further, when the user does not like pressure cooked rice having glutinous and sticky texture but non-pressure cooked rice having soft texture, there is a problem in that the user needs to purchase or use a separate non-pressure type electric rice cooker, or to separately cook the rice using a common pot.

In this regard, although a soft texture is provided by further opening the solenoid valve at a certain time/cycle in the cooking process, reducing thermal power, or increasing a soaking time, it is still inferior to a taste of rice cooked with the non-pressure electric rice cooker.

Also, when an inner pressure of the inner pot is present while cooking, since it is not possible to open or close the lid to check the cooking state or add ingredients because of a pressure safety device for blocking the opening of the lid in a high pressure state of the inner pot, there is a problem in that such a situation results in discomfort to the user.

SUMMARY OF THE INVENTION

To solve the above problems, the present invention is directed to providing an electric cooker that is capable of cooking both in a pressure state and in a non-pressure state inside an inner pot so that cooking quality and ease of use are improved.

To achieve such an object, the present invention is directed to providing an electric cooker including a main body in which an inner pot for accommodating food is installed; a lid coupled to an upper portion of the main body to be opened or closed and in which a passthrough portion is formed; a pressure converter communicating with the passthrough portion, in which a selectively opened/closed state for discharging steam inside the inner pot is maintained; and a pressure-responsive actuators communicating with the passthrough portion and selectively opened/closed depending on a pressure level inside the inner pot in a pressure cooking mode.

BRIEF DESCRIPTION OF THE DRAWING

The features and advantages of the present invention will be better understood with reference to the following detailed description of exemplary embodiments and the accompanying drawings of the present invention.

DETAILED DESCRIPTION

Hereinafter, exemplary embodiments of the present invention be described with reference to the accompanying drawings. In describing the exemplary embodiments, the same designations and reference numerals are used for the same components, and thus, repetitive description thereof will be omitted in the following.

Figure 1:
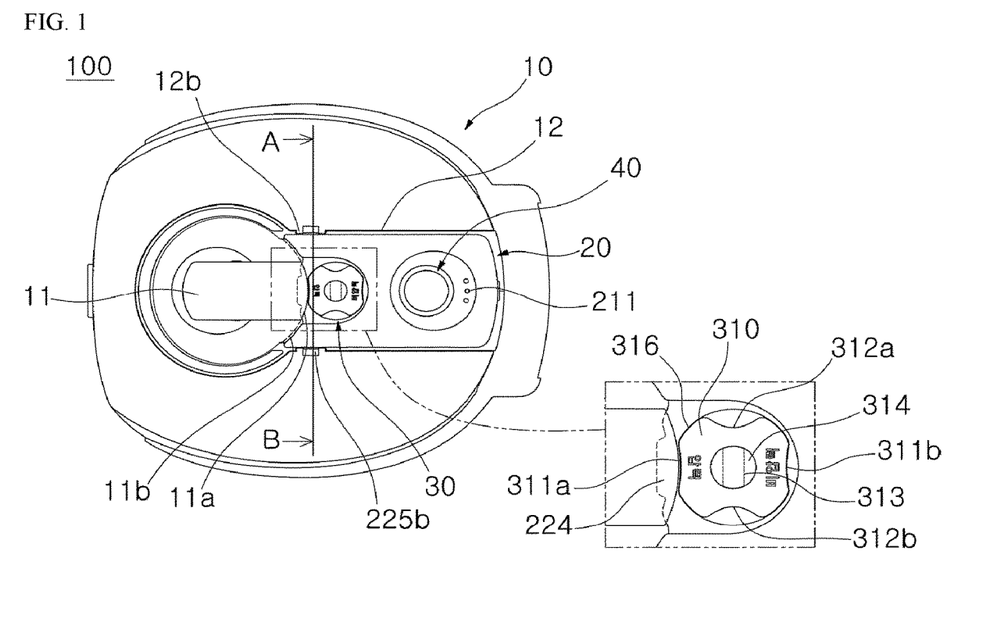
FIG. 1 is a plan view of a lid of an electric cooker according to an exemplary embodiment of the present invention.
Figure 2A:
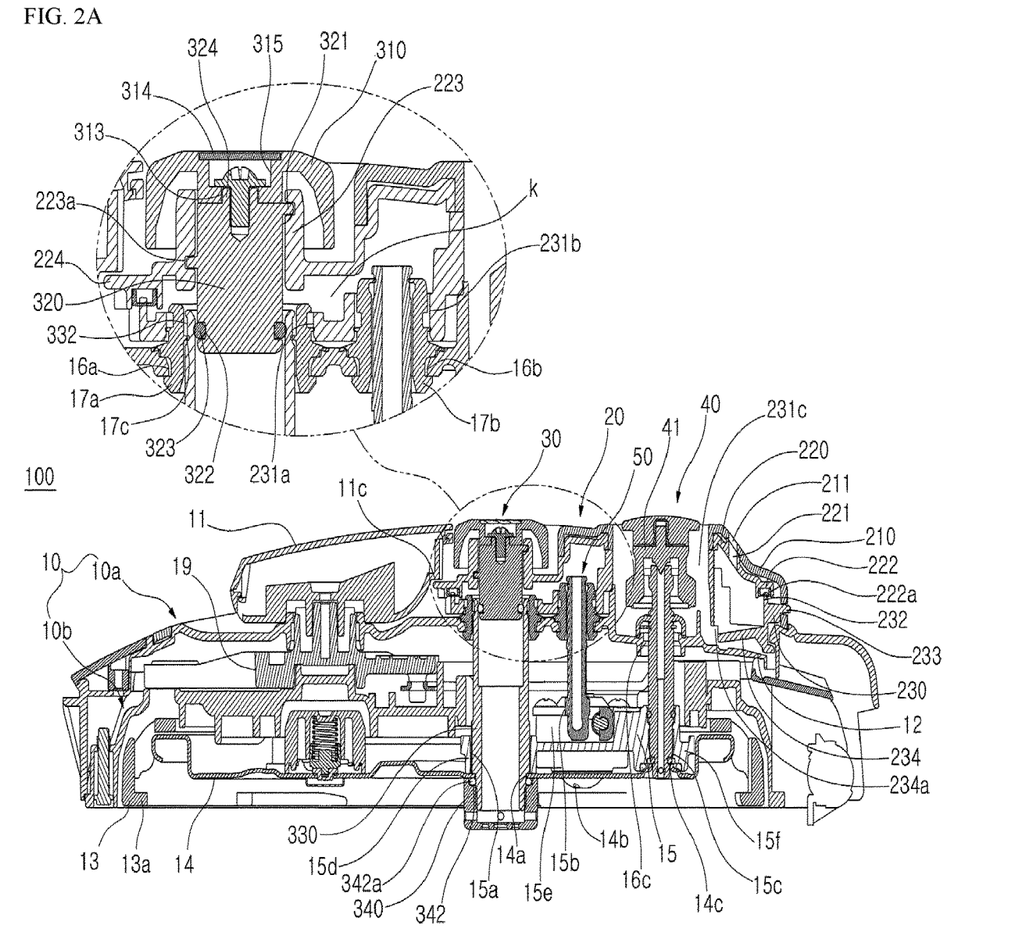
FIGS. 2A and 2B are cross-sectional views of opened/closed states of a pressure converter in an electric cooker according to an exemplary embodiment of the present invention.
Figure 2B:
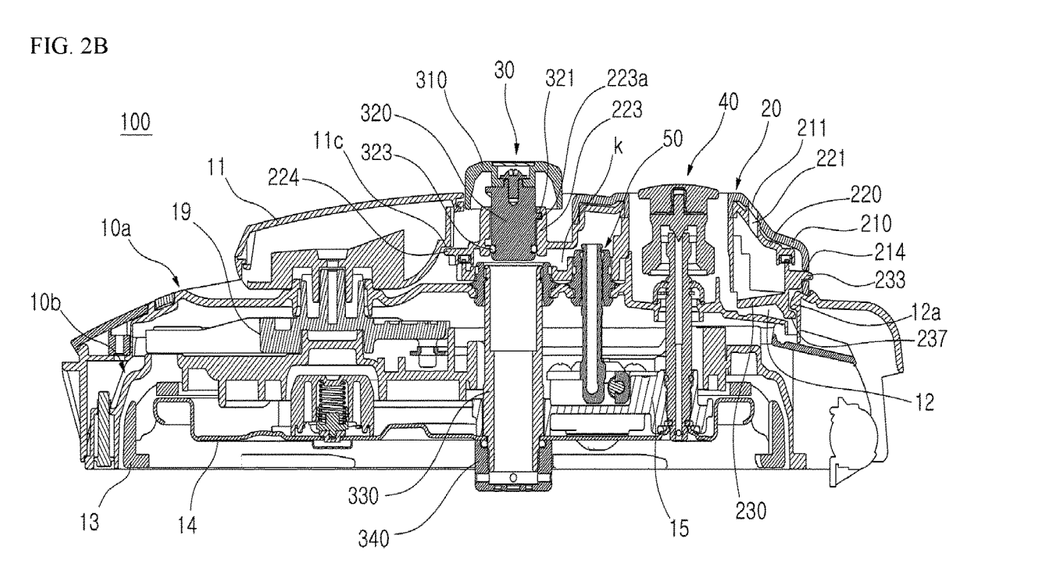
Figure 3:
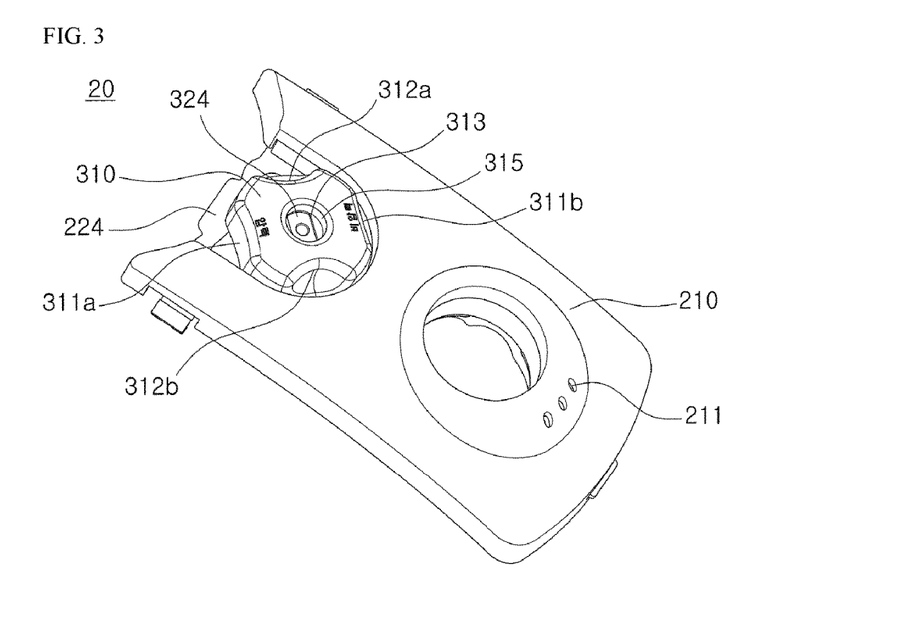
FIG. 3 is a perspective view of a steam cap of an electric cooker according to an exemplary embodiment of the present invention.
Figure 4A:
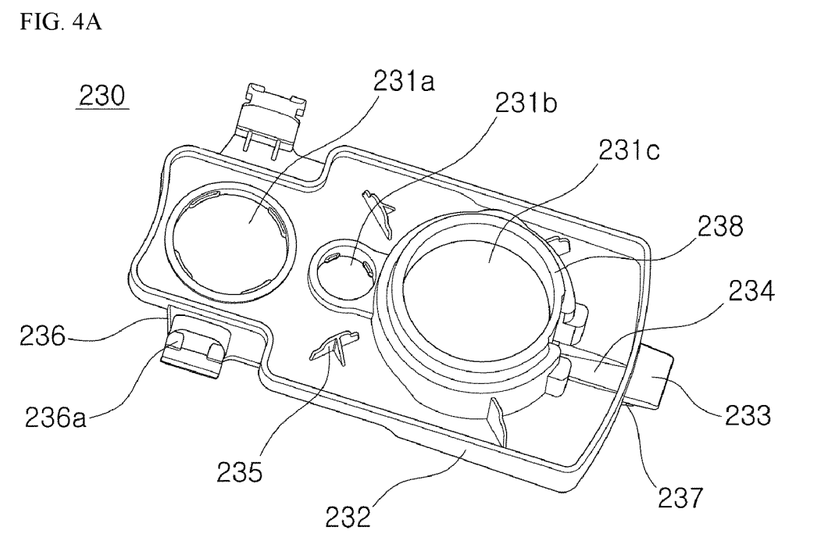
FIGS. 4A, 4B, and 4C are exploded perspective views of a steam cap of an electric cooker according to an exemplary embodiment of the present invention.
Figure 4B:
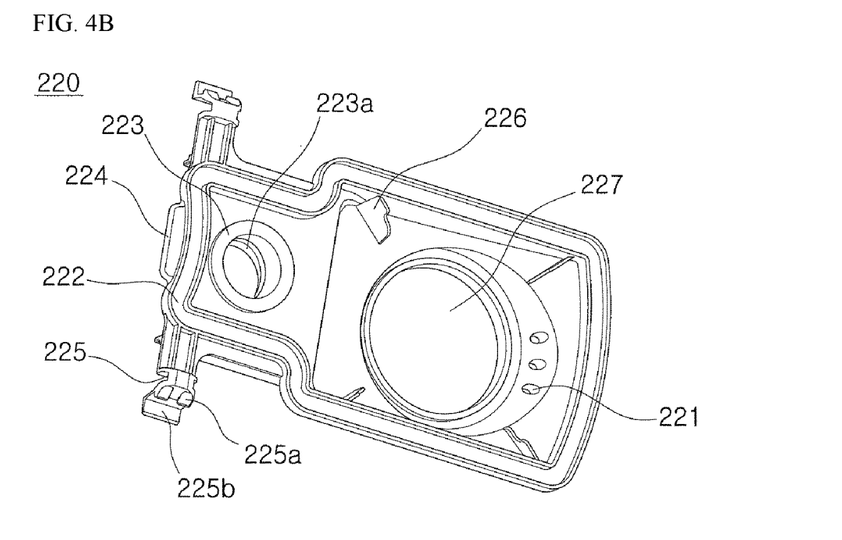
Figure 4C:
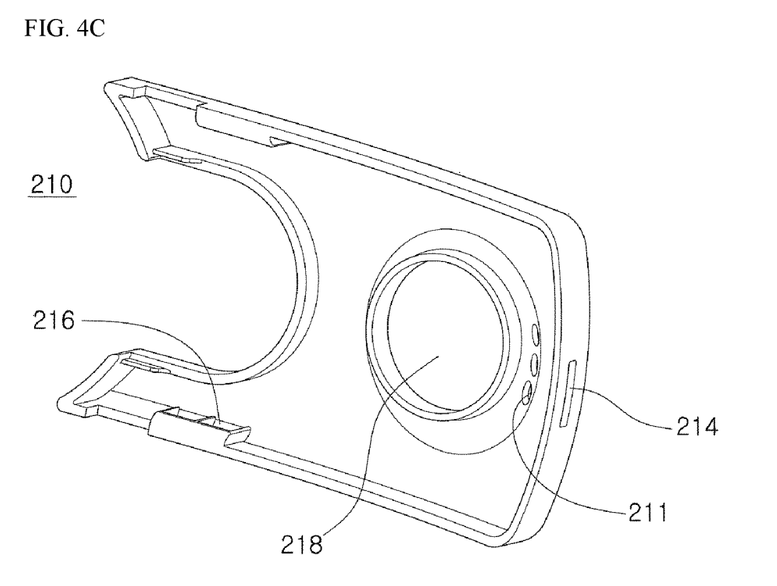
Figure 5A:
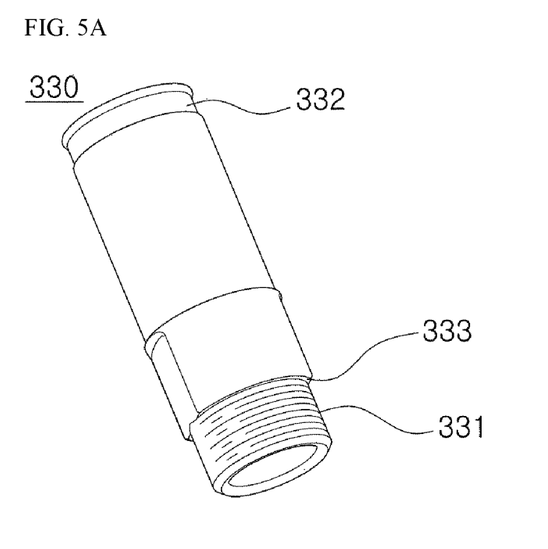
FIGS. 5A, 5B, and 5C are exploded perspective views of a pressure converter of an electric cooker according to an exemplary embodiment of the present invention.
Figure 5B:
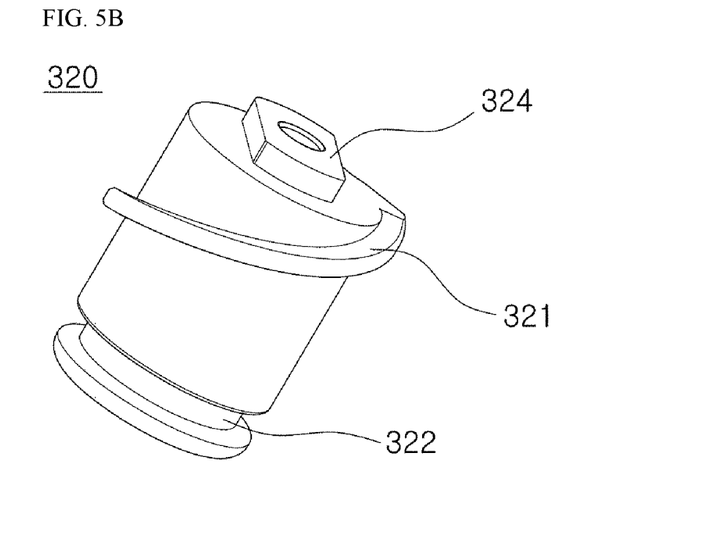
Figure 5C:
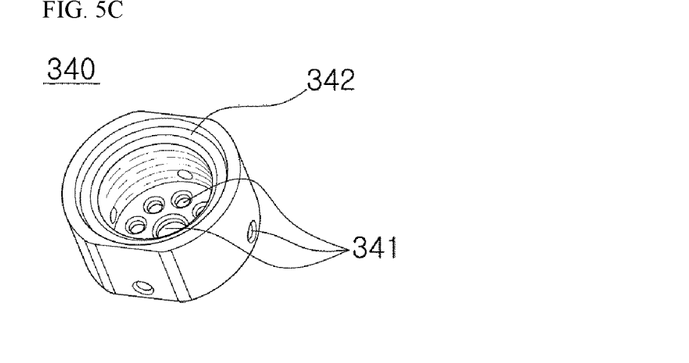
Figure 6:
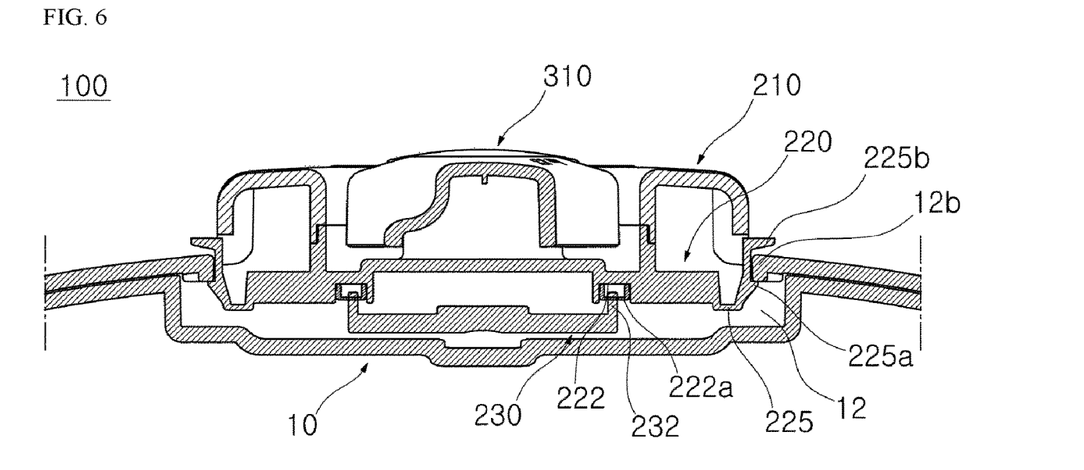
FIG. 6 illustrates a cross-sectional view taken along line AB of FIG. 1.

FIG. 1 is a plan view of a lid of an electric cooker according to an exemplary embodiment of the present invention. FIGS. 2A and 2B are cross-sectional views of opened/closed states of a pressure converter in the electric cooker according to an exemplary embodiment of the present invention. Also, FIG. 3 is a perspective view of a steam cap of an electric cooker according to an exemplary embodiment of the present invention, and FIGS. 4A, 4B, and 4C illustrate an exploded perspective views of a steam cap of an electric cooker according to an exemplary embodiment of the present invention. Further, FIGS. 5A, 5B, and 5C are exploded perspective views of a pressure converter of an electric cooker according to an exemplary embodiment of the present invention, and FIG. 6 is a cross-sectional view taken along line A-B of FIG. 1.

As shown in FIGS. 1 to 6, an electric cooker 100 according to the present invention include a main body (not shown), a lid 10, pressure-responsive actuators 40 and 50, and a pressure converter 30.

In this case, a mounting space provided with a heater, such as a hot plate heater, an induction heating device, or the like, is formed inside the main body (not shown), and an inner pot (not shown) for accommodating food is installed inside the mounting space. In this case, a plurality of constraining protrusions, which protrude radially outward, are disposed to be spaced apart from each other at an upper end rim of the inner pot (not shown).

Meanwhile, referring to FIGS. 1 and 2A, the lid 10 includes an inner lid 10b, which is coupled to an upper portion of the main body (not shown) to be opened/closed and equipped with various electrical parts and wiring, and an outer lid 10a covering the inner lid 10b. In this case, a locking ring 13 is rotatably coupled to a bottom surface portion of the inner lid 10b, and a plurality of locking protrusions 13a, which protrude radially inward, are disposed at an inner circumferential portion of the locking ring 13 to correspond to the constraining protrusions.

In addition, a handle 11 is provided at one side of the upper surface portion of the outer lid 10a, connected to the locking ring 13 through a rotational opening/closing part 19, and rotated while interlocked with the locking ring 13. In this case, the rotational opening/closing part 19 may restrict the rotation of the handle 11 or locking ring 13 so as not to open the lid 10 when one side or the other side of the rotational opening/closing part 19 is connected to a pressure safety device and a residual pressure is present inside the inner pot.

In this case, it is preferred that the handle 11 is formed to extend so as to be biased toward one side from a rotation center such that a rotation state can be easily identified from a long distance. Further, an end portion 11a of the portion extending and biased toward one side is preferably configured to be rounded in an arc shape corresponding to a rotation locus during a rotation operation of the handle 11.

At an unlocking rotation angle at which the end portion 11a of the handle 11 is disposed to face a side portion of the lid 10, the locking protrusions 13a are disposed in a space between constraining protrusions (not shown). Accordingly, the locking ring 13 and inner pot (not shown) are unlocked such that the lid 10 is opened or closed. Further, at a locking rotation angle at which the end portion 11a of the handle 11 is disposed to face one side end of the lid 10, the locking protrusions 13a are engaged with lower ends of the constraining protrusions (not shown) such that the locking ring 13 and the inner pot (not shown) may be mutually locked.

A lead plate 14 is coupled to a lower surface portion of the inner lid 10b, and an inner pot cover (not shown) for sealing an upper end opening of the inner pot is installed at a lower surface portion of the lead plate 14. In this case, a plurality of steam flow holes are formed in one side of the inner pot cover (not shown) such that steam inside the inner pot is discharged. Further, a plurality of communication holes 14a, 14b, and 14c are formed in one side facing the steam flow holes in the lead plate 14.

An upper surface portion of the lead plate 14 is provided with a control plate 15 that integrally covers each of the communication holes 14a, 14b, and 14c and through which mounting holes 15a, 15b, and 15c are formed to pass. In this case, mounting portions 15d, 15e, and 15f may be formed to extend along a rim of each of the mounting holes 15a, 15b, and 15c in the control plate 15. Further, the pressure-responsive actuators 40 and 50 and the pressure converter 30 may be collected into a single part, and may be fixed to and supported by the mounting portions 15d, 15e, and 15f. Of course, the control plate 15 and the lead plate 14 may be provided in one piece.

A mounting groove 12 recessed such that a lower end of the steam cap 20 is inserted thereinto is preferably formed in one side of an upper surface portion of the outer lid 10a. Further, passthrough portions 16a, 16b, and 16c are preferably formed in a bottom surface of the mounting groove 12 such that the passthrough portions 16a, 16b, and 16c are disposed to face the mounting portions 15d, 15e, and 15f of the control plate 15. In this case, although the passthrough portions 16a, 16b, and 16c may be formed to communicate with each other in an all-in-one structure, it is preferred that the passthrough portions 16a, 16b, and 16c are separately formed in plural. Hereinafter, an example of the passthrough portions 16a, 16b, and 16c separately formed and disposed will be described.

Meanwhile, the pressure converter 30 communicates with one passthrough portion 16a among the passthrough portions 16a, 16b, and 16c, which is adjacent to the other side of the lid 10, and is configured to maintain a selectively opened/closed state for discharging steam inside the inner pot. That is, the pressure converter 30 is configured to continuously maintain a one state selected from among an opened state and a closed state during a cooking process.

The pressure-responsive actuators 40 and 50 communicate with the other passthrough portions 16b and 16c, except the passthrough portion 16a communicating with the pressure converter 30. In this case, the pressure-responsive actuators 40 and 50 is selectively opened or closed depending on a pressure level inside the inner pot in a pressure cooking mode in which the pressure converter 30 is closed.

In this case, the pressure-responsive actuators 40 and 50 include a solenoid valve 50 opened or closed in response to an electrical signal and a pressure relief valve 40 with a weight 41 lifted or lowered depending on a steam pressure inside the inner pot. In this case, the pressure-responsive actuators 40 and 50 may be respectively disposed in two passthrough portions 16b and 16c, which are adjacent to one side of the lid 10, among the passthrough portions 16a, 16b, and 16c. Specifically, when the pressure converter 30 is opened, cooking may be performed in a non-pressure cooking mode in which the steam inside the inner pot continues to be discharged. When the pressure converter 30 is closed, the cooking may be performed in a pressure cooking mode in which a pressure level inside the inner pot remains constant by the pressure-responsive actuators 40 and 50.

Meanwhile, referring to FIGS. 1 to 3, the steam cap 20 is configured to have a size which covers the passthrough portions 16a, 16b, and 16c, in which the pressure-responsive actuators 40 and 50 and the pressure converter 30 are installed, and to be detachably connected to the mounting groove 12. In this case, the steam cap 20 is disposed adjacent to the handle 11 along the upper surface portion of one side of the lid 10, and is preferably formed to be rounded so that the other end portion thereof does not overlap the rotation locus 11b of one end portion 11a during a rotational operation of the handle 1. Specifically, the steam cap 20 may include an upper body 220 and a lower body 230. Further, the steam cap 20 may further include a cover portion 210 forming an upper exterior of the upper body 220.

Here, referring to FIGS. 2A to 4A, steam flow holes 231a, 231b, and 231c corresponding to the passthrough portions 16a, 16b, and 16c are formed to pass through a bottom portion of the lower body 230, and a partition wall 232 protrudes along a rim of the bottom portion of the lower body 230.

An assembly rib 233 and an engagement rib 237 preferably protrude from one end of the lower body 230 to be spaced apart from each other in a vertical direction. Further, an assembly elastic piece 236, in which an assembly hook protrusion 236a protrudes from an upper end of an outer surface thereof, is preferably provided at both side end portions of the lower body 230. Specifically, the lower body 230 is inserted into the mounting groove 12 such that the engagement rib 237 is inserted and constrained in a lower portion of the constraining step 12a protruding from a rim of one side of the mounting groove 12. In this case, the passthrough portions 16a, 16b, and 16c and the steam flow holes 231a, 231b, and 231c may be arranged in a mutually aligned manner.

Tubular packing members 17a and 17b are installed in a first passthrough portion 16a and a second passthrough portion 16b provided at the other side of the mounting groove 12. In this case, upper portions of the tubular packing members 17a and 17b are inserted into an inner circumferential portion of a first steam flow hole 231a and a second steam flow hole 231b of the lower body 230. Accordingly, a space between the passthrough portions 16a and 16b and the steam flow holes 231a and 231b may be sealed. An auxiliary partition wall 238 protrudes from a rim of a third steam flow hole 231c provided at one side of a bottom portion of the lower body 230.

Meanwhile, referring to FIGS. 1 to 4B, a packing groove 222 is formed in the upper body 220 such that a sealing member 222a is installed in an outer portion of the lower surface of the upper body 220 corresponding to the partition wall 232. Here, the upper body 220 may be seated in the upper portion of the lower body 230 such that the upper end of the partition wall 232 is inserted into a packing groove 222, and a space between the packing groove 222 and the partition wall 232 may be sealed by the sealing member 222a. In this case, the lower surface portion of the upper body 220 and the bottom portion of the lower body 230 are disposed to be spaced apart from each other by the partition wall 232. Also, as the auxiliary partition wall 238 is in close contact with a lower end rim of a pressure weight through hole 227 formed to pass through one side of the upper body 220, a guiding space k may be formed between an outer surface of the auxiliary partition wall 238 and an inner surface of the partition wall 232.

A plurality of through holes 221 communicating with the guiding space k at one side of the pressure weight through hole 227 are formed in the upper surface portion of the upper body 220.

Meanwhile, referring to FIGS. 3 to 4C, the cover portion 210 is configured to cover the upper surface portion of the upper body 220. Further, a pressure weight exposure hole 218 corresponding to the pressure weight through hole 227 and a discharge hole 211 corresponding to the through hole 221 are formed in one side of the upper surface portion of the upper body 220.

A rib insertion hole 214 into which the assembly rib 233 protruding from one end of the lower body 230 is inserted is formed in one end of the cover portion 210, and a hook engagement groove 216 with which the assembly hook protrusion 236a is caught is formed in an inner surface of both sides of the cover portion 210. In this case, the upper body 220 is seated in the upper portion of the lower body 230.

Here, the assembly hook protrusion 236a is inserted into the hook engagement groove 216 in a state in which the cover portion 210 covers the upper portion of the upper body 220 such that the assembly rib 233 is inserted into the rib insertion hole 214. Accordingly, the lower body 230, the upper body 220, and the cover portion 210 may be integrally combined.

An engagement elastic piece 225 in which an engagement hook protrusion 225a protrudes from a lower portion of an outer surface thereof is preferably provided at both ends of the upper body 220. Specifically, when the lower body 230, the upper body 220, and the cover portion 210 are assembled in one piece, the engagement rib 237 of the lower body 230 is inserted into a lower portion of a constraining step 12a of the mounting groove 12, and then the cover portion 210 is pressurized toward the mounting groove 12.

In this case, referring to FIG. 6, the engagement hook protrusion 225a is engaged with an engagement step 12b protruding from a rim of both sides of the mounting groove 12, and the steam cap 20 may be mounted in the mounting groove 12.

Here, when the engagement hook protrusion 225a is hook-coupled with a lower end of the engagement step 12b, a pressurizing protrusion 225b provided at the upper portion of the engagement hook protrusion 225a is seated on an upper end of the engagement step 12b and exposed to the outside. Further, when the hook protrusion 225a is deviated from a lower end of the engagement step 12b by inwardly pressurizing the pressurizing protrusion 225b, the steam cap 20 may be separated.

A separation prevention rib 224 preferably protrudes from one end of the upper body 220. In this case, the separation prevention rib 224 has a length which overlaps a lower end 11c of the handle 11 at a locking rotation angle at which the end portion 11a of the handle 11 is disposed toward one side end of the lid 10.

Accordingly, a separation of the steam cap 20 may be prevented by the separation prevention rib 224 being engaged with the lower end 11c of the handle 11 at the locking rotation angle of the handle 11 at which the lid 10 is locked. Further, when the handle 11 is rotated at an unlocking rotation angle and deviated from an upper side of the separation prevention rib 224, the steam cap may be separated.

Meanwhile, the second passthrough portion 16b is provided with a solenoid valve 50, which may be installed in the second steam flow hole 231b along the inside of a tubular packing member 17b. In this case, an upper portion of the solenoid valve 50 may be covered by the upper body 220, and steam discharged from the solenoid valve 50 may be guided into the guiding space k.

Here, a plurality of flow velocity control ribs 235 and 226 protrude from the upper surface portion of the bottom portion of the lower body 230 and the lower surface portion of the upper body 220. The steam flowing into the guiding space k may be discharged through the through hole 221 and the discharge hole 211 to the outside of the steam cap 20 in a state in which the steam flowing into the guiding space k collides with the flow velocity control ribs 235 and 226 and thus a flow velocity of the steam decreases.

The third passthrough portion 16c is provided with a pressure relief valve 40, which is preferably installed to pass through the steam cap 20 along the inside of the pressure weight through hole 227 and the third steam flow hole 231c.

In this case, the steam flowing into the pressure relief valve 40 may be discharged along the weight 41 and collide with an inner surface of the auxiliary partition wall 238, and may be discharged through a space between the pressure weight through hole 227 and the pressure relief valve 40 to the outside in a state in which the flow velocity decreases.

Meanwhile, referring to FIGS. 2A to 5A, the pressure converter 30 is disposed to pass through the lower surface portion of the lid 10 so that a lower end portion thereof communicates with the inside of the inner pot. The pressure converter 30 is provided with a hollow cylinder 330 having an upper end portion which communicates with the guiding space k. Further, the pressure converter 30 is detachably connected to the steam cap 20 such that the pressure converter 30 is disposed at the upper portion of the cylinder 330, and includes a lift stopper 320 that is lifted or lowered so as to open or close an upper end portion of the cylinder 330.

Specifically, the hollow cylinder 330 is installed such that a lower end portion 331 thereof passes through the communication hole 14a of the lead plate 14 in a state in which the hollow cylinder 330 is fixed to the mounting portion 15d of the control plate 15. Here, referring to FIGS. 2A to 5C, a cylinder cap 340 in which a plurality of steam through holes 341 are formed is preferably coupled to the lower end portion 331 of the hollow cylinder 330 exposed to a lower portion of the lead plate 14.

A packing step 342, on which a sealing member 342a is mounted, is formed at an upper end of an inner circumferential portion of the cylinder cap 340. In this case, mutually corresponding screw threads are respectively formed at each of an inner circumferential portion of the cylinder cap 340 and an outer circumferential portion of the lower end portion 331 of the cylinder 330. Here, when the cylinder cap 340 is rotated and engaged with the lower end portion 331 of the cylinder 330, the sealing member 342a is pressed against a rim of the communication hole 14a between a support step 333 of an outer circumferential portion of the lower portion of the cylinder 330 and the packing step 342 of the cylinder cap 340. Accordingly, a space between the communication hole 14a and the cylinder 330 may be sealed.

Here, the cylinder cap 340 is disposed to face the steam flow hole of the inner pot cover (not shown), and the steam inside of the inner pot may flow through the steam flow hole and the steam through hole 341 to the hollow of the cylinder 330. In this case, the hollow of the cylinder 330 preferably has a large enough cross-sectional area so that the steam generated during cooking is fully discharged, resulting in no pressure inside the inner pot.

The upper end portion of the cylinder 330 may pass through the first passthrough portion 16a and may be disposed in the guiding space k, or may be installed along the tubular packing member 17a in the first steam flow hole 231a. In this case, a ring-shaped sealing groove 332, which is recessed so that a sealing protrusion 17c protruding from an inner circumferential portion of the tubular packing member 17a can be inserted thereinto, is preferably formed in the outer circumferential portion of the upper end portion of the cylinder 330.

Referring to FIGS. 2A to 5B, the upper body 220 is provided with a stopper coupler 223 at a position facing the first steam flow hole 231a. Here, the stopper coupler 223 is formed to pass through the other side of the upper surface portion of the upper body 220 spaced apart from the upper end portion of the cylinder 330 coupled to the first steam flow hole 231a body coupler with a size corresponding to a cross-sectional area of the lift stopper 320. Here, the lift stopper 320 may be assembled into the stopper coupler 223, and the lift stopper 320 may be disposed to face the upper end of the cylinder 330 when the steam cap 20 is assembled into the lid 10.

A spiral engagement protrusion 321 protrudes from an outer circumferential portion of the lift stopper 320, and a spiral engagement groove 223a corresponding to the spiral engagement protrusion 321 is formed in an inner circumferential portion of the stopper coupler 223. Accordingly, the lift stopper 320 may be rotatably engaged in the stopper coupler 223 and detachably connected to the stopper coupler 223, and may be lifted or lowered in a vertical direction inside the stopper coupler 223.

The lift stopper 320 is configured to have an external diameter corresponding to an internal diameter of the hollow of the cylinder 330, and a ring-shaped sealing groove 322 recessed radially inward so that a sealing member 323 can be mounted therein is formed in a lower end of the outer circumferential portion of the lift stopper 320. In this case, as shown in FIG. 2A, when the lift stopper 320 is lowered, the lower end of the lift stopper 320 is inserted into the hollow of the cylinder 330. Here, when the lift stopper 320 is lowered, a space between the cylinder 330 and the lift stopper 320 is sealed by the sealing member 323.

As shown in FIG. 2B, when the lift stopper 320 is lifted, the upper end of the cylinder 330 may be opened and the hollow of the cylinder 330 may communicate with the guiding space k through a space between the upper end portion of the cylinder 330 and the stopper coupler 223. In this case, steam flowing through the hollow of the cylinder 330 from the inside of the inner pot may be discharged through the guiding space k and the discharge hole 211 to the outside.

Here, when the upper end of the cylinder 330 is closed, a cooking mode of the electric cooker is switched to a pressure cooking mode in which the steam pressure inside the inner pot is controlled according to an opening/closing of the solenoid valve 50 and the pressure relief valve 40. Further, when the upper end portion of the cylinder 330 is opened, the cooking mode of the electric cooker is switched to a non-pressure cooking mode in which the steam inside the inner pot is continuously discharged along the guiding space k.

In this manner, in the non-pressure cooking mode, the steam flowing along the hollow of the cylinder 330 is discharged through the guiding space k in a decelerated state. Thus, it is possible to prevent accidents such as burns due to hot steam being rapidly discharged while noise is reduced during the steam discharge, thereby improving the safety and usability of a product. Further, since the food scattered or overflowed through the hollow of the cylinder 330 during the cooking process is collected into the guide space k and does not flow out to the outside of the electric cooker, a user can use the electric cooker more hygienically.

Moreover, referring to FIGS. 2B to 6, since the steam cap 20 is easily detachable from the lid 10 in a hook-coupling manner using the engagement hook protrusion 225a, maintenance such as cleaning can be easily performed. In this case, by the engagement rib 237 constrained to the constraining step 12a at the time of hook-coupling and the separation prevention rib 224 constrained to the lower end 11c of the handle 11 during locking of the handle 11, the hook-coupling and the locking of the handle 11 are more stably secured.

Accordingly, in the pressure cooking mode, the lift stopper 320 is pressurized by the inner pressure of the inner pot so that the steam cap 20 is separated from the lid 10 and the cylinder 330 closed by the lift stopper 320 is opened. Because of this, the risk of accidents such as spewing of hot steam, unwanted discharge of internal food, or the like is minimized.

Meanwhile, the bottom portion of the lower body 230 is preferably configured to be inclined downward toward one side thereof, and a discharge groove 234 recessed to pass through the auxiliary partition wall 238 is preferably formed in one side of the bottom portion of the lower body 230. In this case, the discharge groove 234 may be configured to be inclined downward from one end of the bottom portion toward the auxiliary partition wall 238, and an opening 234a may be formed at the other end connected to the auxiliary partition wall 238 to communicate with the third steam flow hole 231c.

Specifically, in the non-pressure cooking mode, rice water or foreign matter discharged along with the steam through the hollow of the cylinder 330 are collected toward the discharge groove 234 along the downward inclination of the bottom portion. The rice water or foreign matter may pass through the opening 234a along the downward inclination of the discharge groove 234 and may be discharged through the third steam flow hole 231c.

Accordingly, since it is possible to prevent a narrow gap between the flow velocity control ribs 226 and 235 and the discharge hole 211 from being blocked by the foreign matter, the decelerated steam discharge performance is stably maintained. Further, since it is possible to prevent the steam from being discharged toward a portion other than the discharge hole 211, the safety of the product can be improved.

Meanwhile, referring to FIGS. 2A to 3, a D-cut protrusion 324 protrudes from the upper end of the lift stopper 320, and an manipulation cap 310 is coupled to the D-cut protrusion 324 to be exposed at the upper portion of the upper body 220. Here, a recessed portion 315 is formed at a center portion of the manipulation cap 310, and a D-cut engagement hole 313 having a shape corresponding to the D-cut protrusion 324 is formed inside the recessed portion 315 to pass through the recessed portion 315.

Here, a screw member with a head having a larger area than the cross-sectional area of the D-cut engagement hole 313 is fastened to an upper surface portion of the D-cut protrusion 324 passing through the D-cut engagement hole 313 so that the manipulation cap 310 and the lift stopper 320 may be coupled. Further, the upper end of the recessed portion 315 is preferably covered by a finishing member 314 such that the D-cut engagement hole 313 and the upper end portion of the screw member are not exposed to the outside. In this case, as the manipulation cap 310 is rotatably manipulated, the lift stopper 320 may be interlocked and rotated with the manipulation cap 310 to be lifted or lowered along an inner circumferential portion of the stopper coupler 223.

Referring to FIGS. 1 to 2A, the manipulation cap 310 preferably includes handle couplers 311a and 311b at one side and the other side of an outer circumferential portion of the manipulation cap 310 such that the one side and the other side face each other. Here, during a locking rotation of the handle 11, the manipulation cap 310 is disposed adjacent to the end portion 11a of the handle 11. When the handle coupler at one side 311a is rotated at a reference angle facing the end portion 11a during the locking rotation of the handle 11, the upper end of the cylinder 330 may be closed to switch a cooking mode to a pressure cooking mode. When the handle coupler at the other side 311b is rotated at the reference angle, the upper end of the cylinder 330 may be opened to switch the cooking mode to a non-pressure cooking mode.

In this case, the handle couplers 311a and 311b are configured to be recessed radially inward so as to correspond to the rotation locus 11b of the end portion 11a of the handle 11 such that the handle coupler 311a is fitted in the rounded end portion 11a of the handle 11.

An outer circumferential portion 316 of the manipulation cap 310 except the handle couplers 311a and 311b is preferably configured to overlap the rotation locus 11b of the end portion 11a of the handle 11. Here, the manipulation cap 310 is lifted or lowered along with the lift stopper 320 while the cylinder 330 is opened or closed. Therefore, a thickness in a vertical direction of the handle couplers 311a and 311b is preferably set not to be fully deviated from a height range of the end portion 11a of the handle 11 when the manipulation cap 310 is lifted or lowered to switch the cooking mode.

Accordingly, when the handle 11 is rotated at an unlocking rotation angle to be spaced apart from the manipulation cap 310, the manipulation cap 310 may be freely rotated. Further, the pressure cooking mode or the non-pressure cooking mode may be chosen by rotating one of the handle couplers 311a and 311b at the reference angle.

When the handle 11 is rotated at the locking rotation angle after the cooking mode is selected, the end portion 11a of the handle 11 may be fitted into the handle couplers 311a and 311b positioned at the reference angle. In this case, when the handle 11 is rotated at the locking rotation angle, the remaining outer circumferential portion 316 of the manipulation cap 310 is engaged with the end portion 11a of the handle 11 to restrict the rotation of the manipulation cap 310. In other words, it is possible to rotate the manipulation cap 310 and accordingly switch the cooking mode only when the handle 11 is unlocked, and it is not possible to switch the cooking mode when the handle 11 is locked.

Accordingly, it is possible to prevent the rotation of the manipulation cap 310 resulting due to a user's erroneous manipulation in the pressure cooking mode and consequently the opening of the pressure converter 30. Therefore, the high-pressure steam inside the inner pot is discharged through the cylinder 330, thereby preventing possible accidents or degradation of cooking quality.

In the unlocked state of the handle 11, the manipulation cap 310 may be rotated to easily switch between the non-pressure cooking mode for cooking requiring no pressure and the pressure cooking mode for cooking requiring a high pressure such as a pressure cooking.

As a result, various recipes can be freely used with one device, and cooking quality and compatibility of the product can be improved because a user can cook according to the user's preference such as glutinous texture unique to pressure-cooked rice, soft texture unique to non-pressure-cooked rice, and the like. Furthermore, since the pressure safety device is not driven in the non-pressure cooking mode, and thus the lid 10 can be opened and closed freely, an addition of ingredients or a check on a cooking condition can be easily performed during cooking, thereby improving the ease of use of the product.

In addition, in a state in which the manipulation cap 310 is not accurately rotated so as to open or close the upper end portion of the cylinder 330, it is not possible to perform the locking rotation of the handle 11 because the end portion 11a of the handle 11 is engaged with the remaining outer circumferential portion 316 of the manipulation cap 310. Accordingly, the user can easily recognize a state that one of the pressure cooking mode and the non-pressure cooking mode is not selected, thereby improving the safety and ease of use of the product.

Here, grip grooves 312a and 312b for usability during a rotational manipulation of the manipulation cap 310 may be formed between both the handle couplers 311a and 311b. In this case, the grip grooves 312a and 312b are preferably formed by recessing a part of the upper portion of the outer circumferential portion of the manipulation cap 310 radially inward such that a portion 316 overlapping the rotation locus 11b of the end portion 11a of the handle 11 is maintained along the lower portion of the outer circumferential portion of the manipulation cap 310.

As described above, the present invention is not limited to the above-described exemplary embodiments, variations and modifications may be made by a person of ordinary skill in the art to which the present invention pertains without departing from the scope of claims of the present invention, and such variations and modifications fall within the scope of the present invention.

The invention claimed is:

1. An electric cooker comprising:
a main body in which an inner pot for accommodating food is installed;
a lid coupled to an upper portion of the main body to be opened or closed and including a passthrough portion formed therein;
a pressure converter communicating with the passthrough portion, in which a selective opened/closed state is maintained for discharge of steam inside the inner pot; and
a pressure-responsive actuator communicating with the passthrough portion and selectively opened or closed depending on a pressure level inside the inner pot in a pressure cooking mode in which the pressure converter is closed,
wherein the pressure converter includes:
a hollow cylinder disposed to pass through a lower surface portion of the lid and including a lower end communicating with an inside of the inner pot; and
a lift stopper disposed in an upper portion of the cylinder and lifted or lowered to open or close the upper end of the cylinder,
wherein the electric cooker further comprises a steam cap that is detachably connected to the lid to guide steam discharge of the pressure converter and the pressure-responsive actuator, and includes a guiding space communicating with the pressure converter and formed in the steam cap and a discharge hole communicating with the guiding space and formed in an upper surface portion of the steam cap, and
wherein the upper surface portion of the steam cap is provided with a stopper coupler spaced apart from an upper end portion of the hollow cylinder such that the cylinder and the guide space selectively communicate with each other, and the lift stopper is rotatably coupled to an inside of the stopper coupler to be lifted or lowered.

2. The electric cooker of claim 1, wherein a mounting groove recessed such that the steam cap is inserted thereinto is formed at one side of an upper surface portion of the lid.

3. The electric cooker of claim 2, wherein:
an engagement rib constrained to a rim of one side of the mounting groove protrudes from one end portion of the steam cap; and
both side end portions of the steam cap are provided with engagement elastic pieces formed on lower end portions of outer surfaces thereof on which an engagement hook protrusion protrudes to be hook-coupled with both side rims of the mounting groove.

4. The electric cooker claim 1, wherein the steam cap includes:
a lower body in which a steam flow hole corresponding to each passthrough portion is formed in a bottom portion thereof and a partition wall protrudes along a rim of the bottom portion;
an upper body including a packing groove, in which a sealing member is mounted, formed along a lower surface portion thereof corresponding to the partition wall, seated in an upper end of the partition wall, and having a through hole formed in one side of an lower surface portion thereof; and
a cover portion coupled to the lower body and including the discharge hole formed to correspond to the through hole so as to cover the upper body and coupled to the lower body.

5. The electric cooker of claim 4, wherein a plurality of flow velocity control ribs protrude from an upper surface portion of the lower body and a lower surface portion of the upper body such that a flow velocity of steam accommodated in the guiding space decreases.

6. The electric cooker of claim 1, wherein:
a spiral engagement protrusion protrudes from an outer circumferential portion of the lift stopper; and
a spiral engagement groove corresponding to the spiral engagement protrusion is formed in an inner circumferential portion of the stopper coupler.

7. The electric cooker of claim 1, wherein a ring-shaped sealing groove recessed radially inward so that a sealing member is mounted therein is formed in an outer circumferential portion of the lift stopper.

8. The electric cooker of claim 1, wherein a cylinder cap in which a plurality of steam through holes are formed is detachably connected to a lower end portion of the cylinder.

9. The electric cooker of claim 1, wherein:
locking protrusions protrude along an inner circumferential portion of the lid to correspond to a plurality of constraining protrusions protruding from an upper end of the inner pot;
a locking ring, which selectively constrains the constraining protrusions depending on a rotation angle of the lid, is rotatably coupled to a lower surface portion of the lid; and
a handle interlocked and rotated with the locking ring is provided at one side of an upper surface portion of the lid.

10. The electric cooker of claim 9, wherein:
a steam cap for guiding steam discharge of the pressure converter and the pressure-responsive actuator is detachably connected to the upper surface portion of the lid; and
a separation prevention rib protrudes from one end portion of the steam cap so that the separation prevention rib is engaged with the lower end portion of the handle at a time of locking rotation of the locking ring.

11. The electric cooker of claim 9, wherein:
a manipulation cap is coupled to an upper end portion of the lift stopper such that the manipulation cap is exposed at an upper side of the steam cap and rotatably manipulated; and
a handle coupler recessed radially inward so as to correspond to a rotation locus of an end portion of the handle to constrain rotation during a locking rotation of the locking ring is formed in an outer circumferential portion of the manipulation cap.

12. The electric cooker of claim 1, wherein the pressure-responsive actuator includes:
a solenoid valve opened and closed in response to an electrical signal and having an upper end covered by the steam cap so that steam is discharged to the guiding space; and a pressure relief valve installed to pass through an upper surface portion of the steam cap and including a weight lifted or lowered depending on a steam pressure inside the inner pot.

\* \* \* \* \*